Dec. 25, 1956

G. R. PIPES 2,775,184

VEHICLE AIR INTAKE STRUCTURE

Filed May 6, 1953

INVENTOR.
George R. Pipes
BY
McDonald & Fragner
Attorneys

Dec. 25, 1956  G. R. PIPES  2,775,184
VEHICLE AIR INTAKE STRUCTURE
Filed May 6, 1953  2 Sheets-Sheet 2

INVENTOR.
George R. Pipes
BY
McDonald & Trager
Attorneys

United States Patent Office 2,775,184
Patented Dec. 25, 1956

2,775,184

VEHICLE AIR INTAKE STRUCTURE

George R. Pipes, Mayfield Heights, Ohio, assignor to Eaton Manufacturing Company, Cleveland, Ohio, a corporation of Ohio Application May 6, 1953, Serial No. 353,361

5 Claims. (Cl. 98—2)

This invention relates to automotive vehicles and more particularly to a novel structure in association with the rear or tail lights of an automotive vehicle for intaking fresh air for use in the cooling of a condenser of a vehicle air conditioning system.

It has been necessary in connection with providing cooling air for a condenser of an automotive vehicle air conditioning system, especially wherein the condenser is positioned in the vehicle, such as in the trunk or rear portion thereof, to provide atmospheric air intake openings in the vehicle body proper in near proximity to the condenser for the effective pick up of air for its subsequent delivery over and about the condenser. The customary practice has been to position said air intake openings at suitable air pick up points on the vehicle body necessitating in most instances the provision of openings through the body panels and thus alter the normal shaped contours, streamline and ornamentation of the vehicle.

Broadly this invention comprehends the provision of fresh air intake openings for the pick up of cooling air for automotive vehicles utilizing presently existent openings provided in the rear fenders of said vehicles in which the rear or tail lights of said vehicles are normally positioned. Because of this utilization of existent openings, it is unnecessary to form any additional openings through the body panels or fenders of said vehicles which would materially alter the external appearance of the bodies thereof.

Among the principal objects of the invention is the provision of air intake means, for the passage of fresh air therethrough for the cooling of a condenser of an automotive vehicle air conditioning system, wherein the condenser is disposed in or adjacent the rear trunk compartment of the vehicle, that:

a. Do not necessitate the alteration of the body proper of most presently manufactured automotive vehicles;

b. Provide for the simple and economical modification of presently manufactured vehicles to accommodate said air intake means;

c. Utilize conventional openings provided in the rear fenders of automotive vehicles for the rear or tail lights of said vehicles as appropriate air passageways for the delivery of fresh air from outside the vehicle body to a point inside the vehicle body;

d. Are formed in association with the rear or tail lights of automotive vehicles and utilize the conventional openings provided in the rear fenders of the vehicles for said tail lights without materially altering the normal structural beauty and appearance of said tail lights;

e. Comprise an open grill structure, adjacent the tail lights of the vehicles to which applied, blending into or forming a part of the structure of the tail lights permitting of air passage therethrough from externally to internally of the vehicle body; and, f. Blend into the conventional body structure of presently manufactured automotive vehicles so as to be indiscernible as such, whereby the outward appearance of said vehicles is immaterially altered.

Other objects and advantages of the invention will appear from the following description taken in connection with the drawings forming a part of the specification; and in which.

Figure 1:
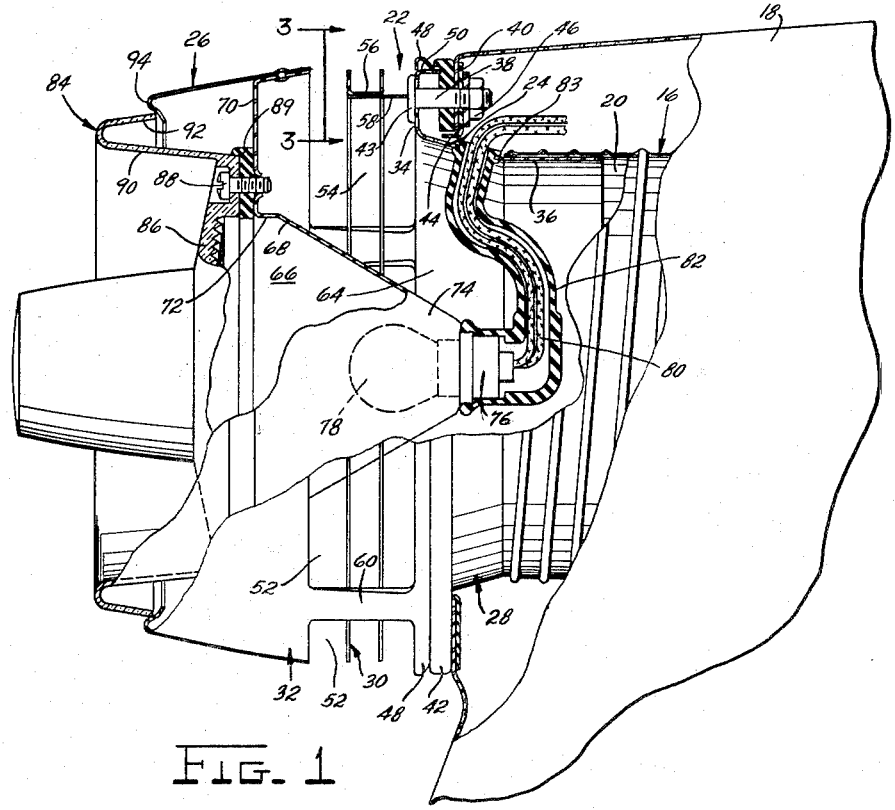
Fig. 1 is a partly broken away, partly cross-sectionalized view of a fresh air intake means, for an automotive vehicle air conditioning system condenser, in constructive association with a tail light of an automotive vehicle.

Referring to the drawings for more specific details of the invention 10 represents generally an automotive vehicle having an air conditioning system 12 incorporated therein including the usual component elements of conventional air conditioners such as a compressor, an evaporator and a condenser disposed in an enlosure or housing 14, arranged in the rear trunk compartment of vehicle 10, directly behind the seat adjacent the trunk compartment.

Figure 2:
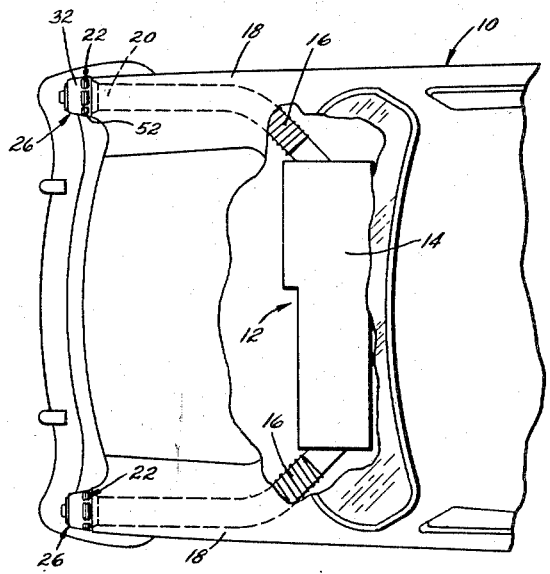
Fig. 2 is a partly fragmentary, partly broken away top elevation view of a vehicle to which the structure of Fig. 1 is applied.

Air, for cooling the condenser of the air conditioning system 10, is conveyed by way of flexible tubes or conduits 16 from air communication externally of vehicle 10 to the interior of housing 14 within which the condenser is located. As noted from Fig. 2, the conduits 16 are disposed inside of the rear fenders 18 of the vehicle 10 along and adjacent the outer wall panel of the fenders and as such do not encroach upon the normal space provided in the trunk of the vehicle.

The air intake end 20 of each of the conduits 16 is fitted in air communicating relation upon an air intake structure 22 mounted upon the rear fender 18 of vehicle 10 disposed in and adjacent an opening 24 provided in the fender. Opening 24 is the opening normally provided in the rear fender of the vehicle 10 through which the electrical connections for the tail lights thereof extend and in and over which the tail light reflectors and lens enclosures therefor are mounted.

Air intake structure 22 is formed as part of a tail light structure 26 and incldues a sleeve member 28, an annular apertured channel member 30 and an ornamental sleevelike shell 32. Channel member 30 includes end rings 30$^a$ and 30$^b$, and interconnecting axial ribs 62.

Sleeve member 28 has an annular outward radially directed annular flange 34 permitting, as noted from Fig. 1, of the mounting of the sleeve member 28 rigidly upon the end extremity of fender 18 with the body portion 36 of the sleeve member 28 extending axially inwardly of opening 24 in the fender. The flange 34 supports the sleeve member 28 in position by way of being secured by bolts 38 to an annular flange portion 40 of fender 18 surrounding opening 24 thereof with an annular rubber or the like material washer or gasket 42 disposed axially intermediate flanges 34 and 40 so as to provide a cushion support for air intake structure 22. The heads 43 of bolts 38 are preferably welded to or otherwise suitably permanently secured to flange 34 and extend through gasket 42, flange 40, and an annular reinforcing ring 44 positioned on the opposite side of flange 40 from gasket 42, with appropriate nuts 46 threaded upon the threaded extremities thereof for securing the air intake structure 22 in place.

Shell 32, which forms a part of tail light structure 26 as well as a part of the air intake structure 22, is spot welded or otherwise suitably permanently secured at one annular end 48 to an axially extended portion 50 of flange 34 and has a plurality of like equi-circumferentially spaced openings 52 therein axially adjacent end 48 thereof.

Channel member 30 is disposed telescopically within shell 32 intermediate the axial extremities of openings 52 in the shell and provides together therewith a grill for the air intake structure. The channel member 30 has a plurality of like equi-circumferentially spaced openings 54, extending through the base portion 56 thereof, corresponding in circumferential length to the openings 52 in the shell 32 so as to permit of the free passage of air from the exterior to the interior of shell 32, and is supported telescopically in the shell by axially extended circumferentially spaced straps 58 each having one end spot welded to the base portion 56 of channel member 30 and its opposite end spot welded to flange 34 of the sleeve member 28. The width of the straps 58 correspond to the circumferential width of ribs 60, spacing openings 52 of shell 32 apart, and the circumferential width of ribs 62, forming the base portion 56 of channel member 30, spacing openings 54 of channel member 30 apart. By so providing a grill made up of the shell 32 and channel member 30, objects or foreign material of reasonably large size are inhibited from passage into opening 64, provided in the sleeve, through which fresh cooling air, for the condenser of air conditioning system 12, passes.

The reflector 66 for tail light structure 26 includes a conical sleeve portion 68 and an outward radially directed annular flange 70 integral with conical sleeve portion 68 at the large end 72 thereof. Flange 70 includes an axially directed annular portion riveted or otherwise fixedly secured to the shell 32 intermediate its axial length internally thereof for supporting the reflector coaxially of the shell 32 and providing for the reflection of light axially away from the rear extremity of fender 18. The small end 74 of the sleeve portion 68 of the reflector extends axially centrally into the opening 64 of sleeve member 28. An electric lamp socket 76, having a bulb or lamp 78 fitted therein, is positioned on the reflector 66 at the open end 74 thereof with the bulb 78 extending coaxially centrally of the reflector 66. An electric cord 80 for conveying electricity to the bulb 78, from a source, not shown, has one end connected to the socket 76 and is encased, for a portion of its length, by a rubber sleeve or sheath 82 extending between the socket 76 and sleeve member 28 with one end of the sleeve 82 held on sleeve member 28 in adjacent surrounding relation to an opening 83 through which cord 80 extends. The opposite end of sleeve 82 resiliently embraces a portion of socket 76 adjacent the reflector at the small end thereof.

An ornamental circular glass lens 84 includes a central body 86, secured by screws 88 to the reflector 66, with a cushioning or gasket 89 disposed intermediate an annular portion of body 86 and flange 70 of reflector 66, and an outward radially disposed annular portion 90 having its end 92 in annular engagement with the end extremity 94 of shell 32.

The combined structure of the shell 32, reflector 66, lens 84, and channel member 30 provides an ornamental tail light structure while at the same time providing air intake passages through the openings 52 provided in shell 32 and channel member 30 such that the air, exterior of the tail light structure, can pass through openings 52 and 54, and by way of opening 64, in sleeve 28, into conduit 16, which is resiliently fitted over the sleeve member, for subsequent delivery through conduit 16 to the housing 14 for cooling the condenser of the air conditioner located in the housing 14.

Figure 4:
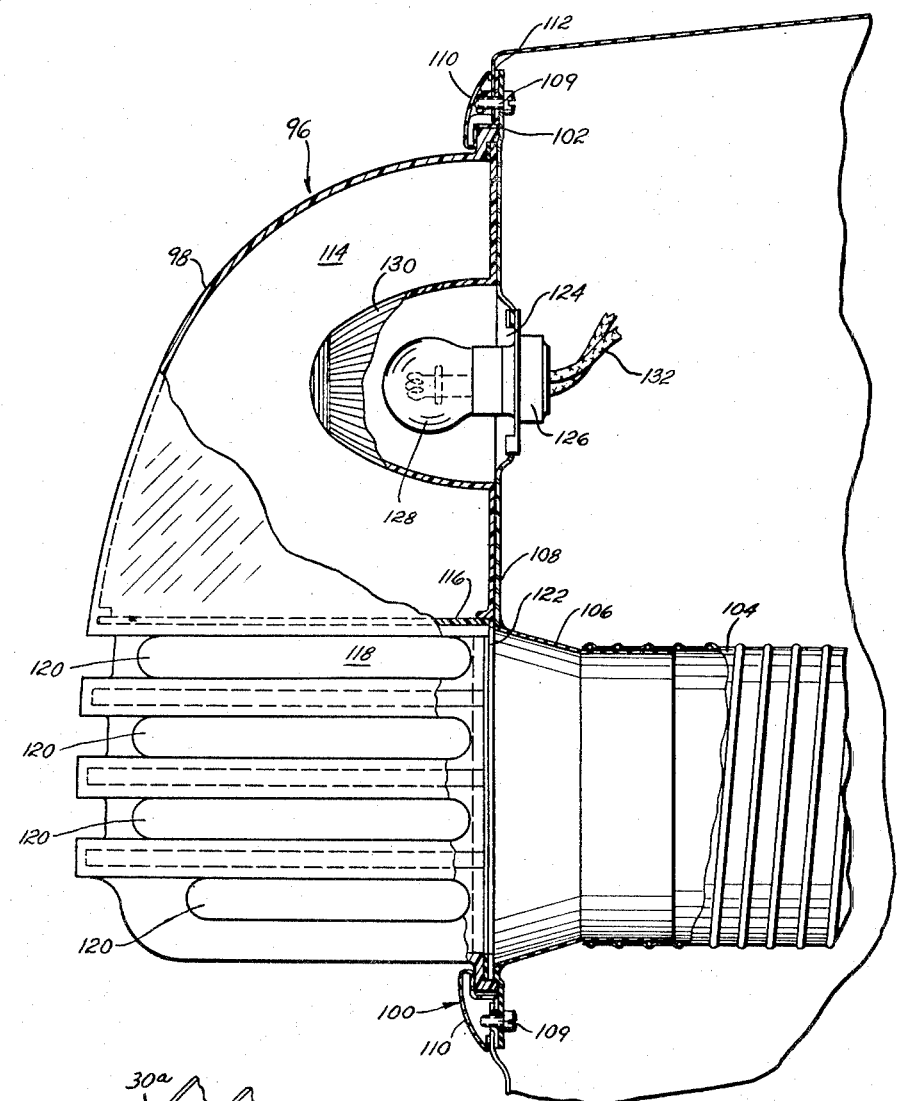
Fig. 4 is a partly broken away, partly cross-sectionalized view of a modified fresh air intake-tail light assembly, from that of Fig. 1.
Figure 3:
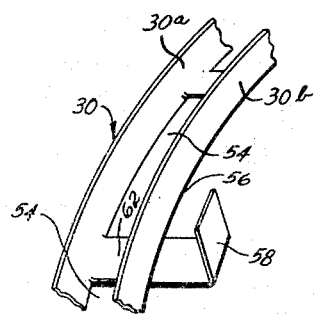
Fig. 3 is a perspective partly broken away portion of of an apertured channel member as incoporated in the air intake means of Fig. 1.

Fig. 4 discloses an automotive vehicle air conditioning system fresh air intake means, incorporated in the tail light assembly of the vehicle within which the air conditioning system is incorporated which is modified from the structure of Fig. 1. The combined air intake-tail light assemblies disclosed respectively by Figs. 1 and 4 are applicable in the same manner at the rear extremities of the rear fenders of vehicles but styled characteristically to the vehicles on which they are mounted so as to conform to the styling of the bodies and trim thereof.

The air intake-tail light assembly 96 includes basically an ornamental plastic lens 98 attached by suitable means 100 to the rear extremity of a fender in covering relation to opening 102 provided in the rear extremity of the fender and air conveying flexible tubing or conduit 104 supported, in inward extending manner within the fender, by a sleeve 106 secured upon a support plate 108 which is in turn securely mounted to the fender in the opening 102 thereof.

The means for securing lens 98 to the fender includes an ornamental trim piece 110 which engages a perimetral flange of the lens and a plurality of screws 109 or the like extending, into securing engagement with the trim piece 110, through a perimetral flange 112 of the fender surrounding the opening 102 therethrough.

The lens 98 is bulbous in shape and extends, from its held position on the fender, rearwardly thereof thus providing a chamber 114 internally thereof with the support plate 108. A plate 116 arranged internally of the lens provides one end enclosure for chamber 114 and as such provides another chamber 118 within the lens having communication with the open end of sleeve 106 to which one end of the conduit 104 is attached. A plurality of openings 120 are provided extending through the lens into communication with chamber 118 permitting of the free passage of fresh air from a point exterior of the lens to the ducting 104, by way of chamber 118, for delivery to the air conditioning system attached at the opposite end of the ducting from its attachment to sleeve 106.

Support plate 108 is secured to one side of flange 112 inwardly of the fender by the screws 109, and has an aperture 122 therethrough conforming to the open end of sleeve 106 so that air passageway communication is provided between chamber 118 and sleeve 106, and an aperture 124 within which a lamp socket 126 is mounted. A lamp or bulb 128 is fitted in the socket extending into the chamber 114 with a cupola styled glass lens 130 enclosing the lens 128 in the chamber 114. The lens 130 is clamped in supported relation intermediate the lens 98 and support plate 108. Electrical current for the lamp 128 is supplied thereto from a suitable source, not shown, by way of electrical cord 132 connected to socket 126.

Although the basic invention presented herein directed to the provision of fresh air intake means for vehicle air conditioning apparatus arranged in association with the rear or tail lights of vehicles has been disclosed relative to specific structures, it is readily conceivable that it can be applied to many varied ornamental tail light structures without departing from the basic idea promulgated hereby and accordingly the invention is to be interpreted in terms of the structure presented herein as defined by the appended claims.

What I claim is:

1. In an automotive vehicle having rear fenders with a taillight opening in the rear extremity of at least one of the fenders and a compartment in the rear body thereof with a vehicle air conditioning apparatus located in said compartment, the combination of a taillight assembly mounted on the rear extremity of the fender in said opening, said taillight assembly including an annular mounting member adapted to be received in sealed relation thereto, a shell having openings therethrough communicating with the atmosphere and a lamp reflector mounted internally of the shell, a conduit secured to a portion of the mounting member and extended inwardly of the fender between the shell and air conditioning apparatus in open communication with the atmosphere through the shell.

2. In an automotive vehicle according to claim 1, wherein the mounting member includes a sleeve portion extending rearwardly inside the fender and wherein one end of the conduit is coupled thereto in air flow communication.

3. In an automotive vehicle according to claim 2, wherein the shell is fixedly secured to the mounting member and extends outwardly away from the fender with which it is associated.

4. In an automotive vehicle according to claim 3, wherein the shell is cylindrical in shape and provides equi-circumferentially spaced openings therein adjacent the mounting member.

5. In an automotive vehicle according to claim 4, wherein the reflector is supported upon the shell adjacent atmosphere air passage means through the shell.

References Cited in the file of this patent
UNITED STATES PATENTS

| | | |
|---|---|---|
| 1,934,998 | Stahlknecht | Nov. 14, 1933 |
| 2,171,622 | Calkins | Sept. 5, 1939 |
| 2,248,329 | Bell | July 8, 1941 |
| 2,480,510 | Roper | Aug. 30, 1949 |
| 2,551,923 | Berge | May 8, 1951 |
| 2,569,009 | Kuempel | Sept. 25, 1951 |
| 2,667,572 | Mead et al. | Jan. 26, 1954 |